US008054403B2

United States Patent
Kim et al.

(10) Patent No.: US 8,054,403 B2
(45) Date of Patent: Nov. 8, 2011

(54) BACKLIGHT UNIT AND LIQUID CRYSTAL DISPLAY DEVICE HAVING THE SAME

(75) Inventors: Hyo Jin Kim, Gyeongbuk (KR); Jae Won Shin, Gyeongbuk (KR); Dal Jae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 308 days.

(21) Appl. No.: 12/549,711

(22) Filed: Aug. 28, 2009

(65) Prior Publication Data

US 2010/0085506 A1   Apr. 8, 2010

(30) Foreign Application Priority Data

Oct. 7, 2008  (KR) ........................ 10-2008-0097994

(51) Int. Cl.
*G02F 1/1335* (2006.01)
*F21V 7/22* (2006.01)

(52) U.S. Cl. .......... 349/61; 349/56; 362/97.1; 362/97.2; 362/612

(58) Field of Classification Search ..................... 349/56, 349/61, 62, 63, 67; 362/97.1, 97.2, 97.3, 362/97.4, 612
See application file for complete search history.

(56) References Cited

U.S. PATENT DOCUMENTS

| 7,638,754 | B2* | 12/2009 | Morimoto et al. | 250/226 |
|---|---|---|---|---|
| 7,641,360 | B2* | 1/2010 | Chou et al. | 362/235 |
| 7,891,854 | B2* | 2/2011 | Hamada | 362/612 |
| 2007/0242459 | A1* | 10/2007 | Nishigaki | 362/276 |
| 2008/0245949 | A1* | 10/2008 | Morimoto et al. | 250/205 |
| 2009/0067158 | A1* | 3/2009 | Hamada | 362/97.3 |
| 2009/0251922 | A1* | 10/2009 | Ueyama | 362/613 |
| 2010/0085506 | A1* | 4/2010 | Kim et al. | 349/61 |

* cited by examiner

*Primary Examiner* — Brian Healy
(74) *Attorney, Agent, or Firm* — Morgan, Lewis & Bockius LLP

(57) ABSTRACT

A backlight unit having improved reliability is disclosed.
The backlight unit includes a support main formed of a mold having a rectangular frame shape, a plurality of LEDs arranged at a side of the support main, a light guide plate arranged parallel to the plurality of LEDs and converting a point light to a surface light, an optical sensor unit arranged at the other side of the support main and detecting light emitted from the plurality of LEDs, and a light incident hole formed at the other side of the support main corresponding to the optical sensor unit and guiding light output from the light guide plate to proceed toward the optical sensor unit by changing a path of the light.

9 Claims, 3 Drawing Sheets

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2008-00977994, filed on Oct. 7, 2008, which is hereby incorporated by reference in its entirety.

BACKGROUND

1. Field of the Disclosure

This disclosure relates to a backlight unit, and more particularly, to a backlight unit having improved reliability, and a liquid crystal display (LCD) device having the backlight unit.

2. Description of the Related Art

Display devices used for computer monitors or TVs include self-light emitting devices such as organic light emitting displays (OLEDs), vacuum fluorescent displays (VFDs), field emission displays (FEDs), and plasma display panels (PDPs), and non self-light emitting devices such as liquid crystal displays (LCDs). A general LCD device includes two substrates having electric field generation electrodes and a liquid crystal layer having dielectric anisotropy and interposed between the substrates. When a voltage is applied to the electric field generation electrodes, an electric field is generated in the liquid crystal layer. The strength of the electric field is adjusted by changing the voltage. Thus, a desired image is displayed by controlling transmissivity of light passing through the liquid crystal layer.

The LCD device includes a data driver externally receiving image data and generating data signals of respective pixels and supplying the generated data signals to data lines of an LCD panel, a gate driver generating a gate signal to drive pixels of the LCD panel by one line and supplying the generated gate signal to respective gate line of the LCD panel, and a backlight unit disposed on the rear surface of the LCD panel and providing light.

Cold cathode fluorescent lamps (CCFLs), external electrode fluorescent lamps (EEFLs), or light emitting diodes (LEDs) are used as a light source of a general backlight unit. Recently, the LEDs are widely used as a light source of a backlight unit due to it merits such as high light efficiency, miniaturization capability, low power consumption.

In a backlight unit having the LEDs, a printed circuit board (PCB) or a flexible printed circuit board (FPC) is arranged at an inner side of the backlight unit. A plurality of LEDs are mounted on the PCB or FPC. The LED is a combination of a red LED, a green LED, and a blue LED, respectively, emitting red, green, and blue lights. Since the backlight unit configured as above provides a white light mixed with the red, green, and blue lights to the LCD panel, the red, green, and blue LEDs emitting red, green, and blue lights, respectively, need to be controlled.

BRIEF SUMMARY

Accordingly, the present embodiments are directed to a backlight unit that substantially obviates one or more of problems due to the limitations and disadvantages of the related art.

An object of the embodiment of the present disclosure is to provide a backlight unit having improved reliability.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes a support main formed of a mold having a rectangular frame shape, a plurality of LEDs arranged at a side of the support main, a light guide plate arranged parallel to the plurality of LEDs and converting a point light to a surface light, an optical sensor unit arranged at the other side of the support main and detecting light emitted from the plurality of LEDs, and a light incident hole formed at the other side of the support main corresponding to the optical sensor unit and guiding light output from the light guide plate to proceed toward the optical sensor unit by changing a path of the light.

An LCD device according to another general aspect of the present embodiment includes an LCD panel, a support main formed of a mold corresponding to an edge of a lower side of the LCD panel, a plurality of LEDs arranged at a side of the support main, a light guide plate arranged parallel to the plurality of LEDs and converting a point light to a surface light, an optical sensor unit arranged at the other side of the support main and detecting light output from the plurality of LEDs, and a light guide hole formed at the other side of the support main corresponding to the optical sensor unit and guiding light output from the light guide plate to proceed toward the optical sensor unit by changing a path of the light.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
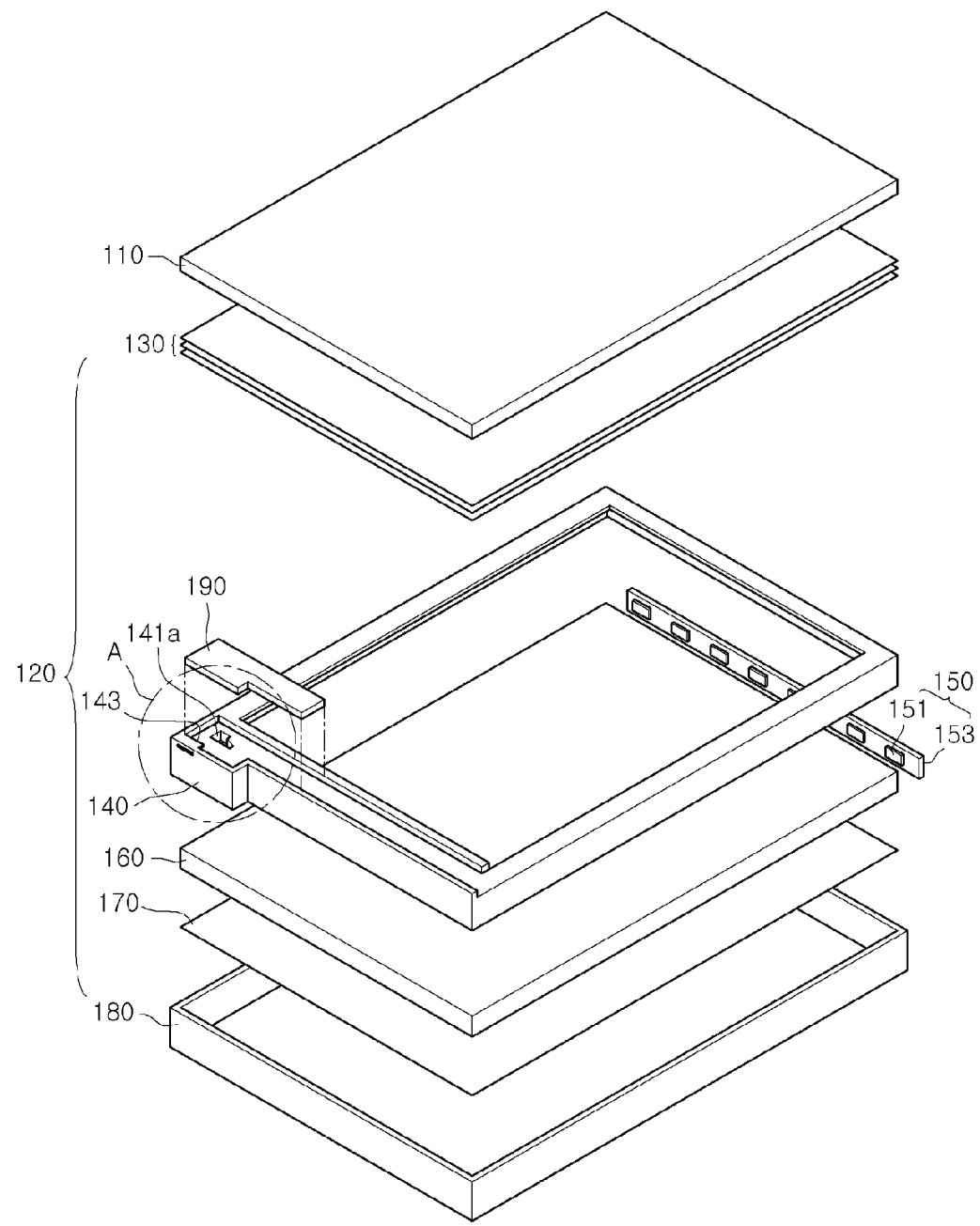
FIG. 1 is an exploded perspective view of an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
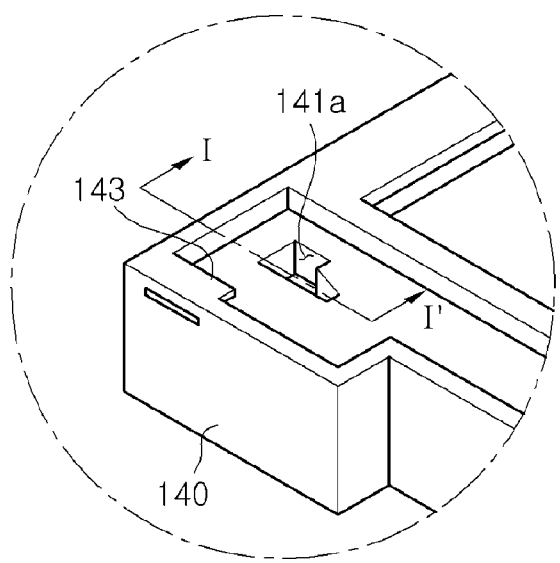
FIG. 2 is a magnified perspective view of a portion A of FIG. 1, illustrating the support main in detail.

FIG. 1 is an exploded perspective view of an LCD device according to an embodiment of the present disclosure. FIG. 2 is a magnified perspective view of a portion A of FIG. 1, illustrating the support main in detail. Referring to FIGS. 1 and 2, the an LCD device according to the present embodiment includes an LCD panel 110 for displaying an image and a backlight unit 120 disposed on a read surface of the LCD panel 110 and providing light to the LCD panel 110.

Although it is not shown in detail in the drawings, the LCD panel 110 includes a thin film transistor (TFT) array substrate and a color filter substrate which are combined together, facing each other and maintaining a uniform cell gap therebetween, and a liquid crystal layer interposed between the TFT array substrate and the color filter substrate. Drivers (not shown) for driving the TFT array substrate are further provided at a side surface of the LCD panel 110.

The backlight unit 120 includes a support main 140 having a rectangular frame shape, a light source unit 150 disposed at an inner side of the support main 140, a light guide plate 160 disposed parallel to the light source unit 150 to convert a point light to a surface light, a plurality of optical sheets 130 disposed on the light guide plate 160 to focus and diffuse the light, and a reflection sheet 170 disposed on a lower surface of the light guide plate 160 to reflect the light proceeding down toward the light guide plate 160 to proceed toward the LCD panel 110. The backlight unit 120 further includes an optical sensor unit 190 disposed at the other side of the support main 140 opposite to the light source unit 150 to detect the light output from the light source unit 150.

The backlight unit 120 further includes a bottom cover 180 coupled to the support main 140 by encompassing the edge and lower surface of the support main 140. The light source unit 150 includes a PCB 153 facing one side of the light guide plate 160 and a plurality of LEDs 151 mounted on the PCB 153.

Although the PCB 153 is described in the present embodiment, a flexible printed circuit board (FPC) may be employed instead, not limited to the above description. The PCB 153 or FPC may be arranged in an upper portion of one side of the support main 140. The FPC is a circuit board formed by forming a complicated circuit on a flexible insulation film. The FPC is formed of a soft material, that is, a heat-resistant plastic film such as polyester (PET) or polyimide (PI).

The LEDs 151 respectively emit red, green, and blue lights. The LEDs 151 emitting the red, green, and blue lights may be separately driven.

The support main 140 is formed of a mold having a rectangular frame shape corresponding to the lower edge of the LCD panel 110 and accommodates the light source unit 150, the light guide plate 160, and the reflection sheet 170. Although in the present embodiment the optical sheets 130 are arranged on the support main 140, the optical sheets 130 may be accommodated in the support main 140, not limited to the above description.

The light source unit 150 is accommodated at one side of the support main 140 while the optical sensor unit 190 is arranged on the upper surface of the other side of the support main 140. The light source unit 150 and the optical sensor unit 190 are arranged at the opposite positions, facing each other.

A fixing protrusion 143 for fixing the optical sensor unit 190 protrudes on the upper surface of the other side of the support main 140 corresponding to the optical sensor unit 190, in a direction from the inner side surface of the support main 140 toward the inside of the support main 140. The fixing protrusion 143 prevents the optical sensor unit 190 from being detached from the support main 140 by fixing the one side of the FPC of the optical sensor unit 190.

A light incident hole 141a is formed at the other side of the support main 160 corresponding to the optical sensor unit 190 so that light may be incident on the optical sensor unit 190. The light incident hole 141a overlaps with part of the optical sensor unit 190. The light incident hole 141a guides part of the light output from the light guide plate 160 to proceed toward the optical sensor unit 190. Although it is not illustrated in detail in the drawings, the inner side surface of the light incident hole 141a has at least two inclined surfaces having different inclination angles.

The optical sensor unit 190 detects the light guided by the light incident hole 141a of the support main 140 to correct color of the light output from the light guide plate 160. That is, the optical sensor unit 190 detects the light output from the light guide plate 160 so that the backlight unit 120 may emit a white light toward the LCD panel 110. Also, a backlight driving unit (not shown) controls the LEDs 151 that respectively emit the red, green, and blue lights.

The light guide plate 160 is disposed parallel to the LEDs 151 and converts a point light emitted from each of the LEDs 151 to a surface light. The optical sheets 130 include at least one diffuser sheet, at least one focus sheet, and at least one protection sheet. The reflection sheet 170 reflects the light output from the light guide plate 160 to proceed toward the LCD panel 110, thereby improving the light efficiency of the backlight unit 120.

Figure 3:
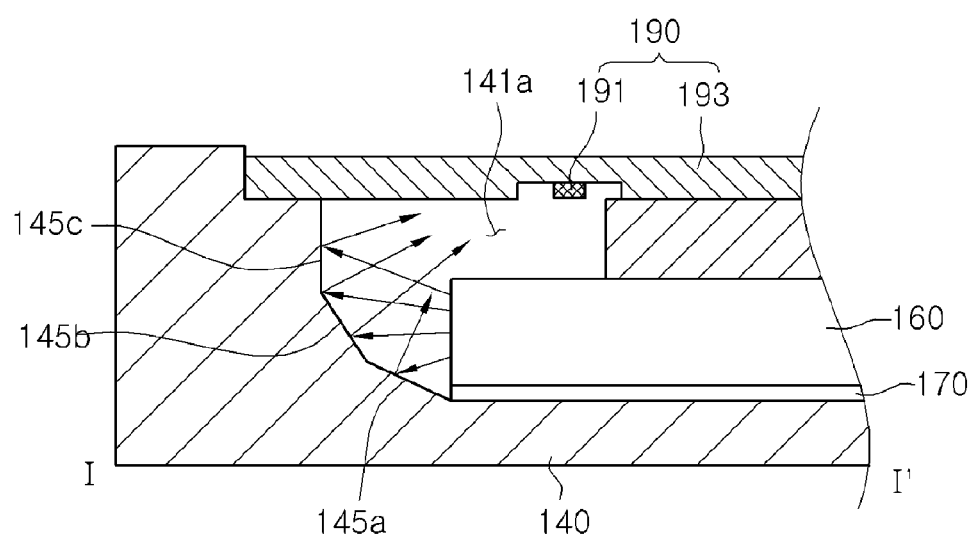
FIG. 3 is a cross-sectional view taken along line I-I' of FIG. 2, illustrating the backlight unit of FIG. 1.
Figure 4:
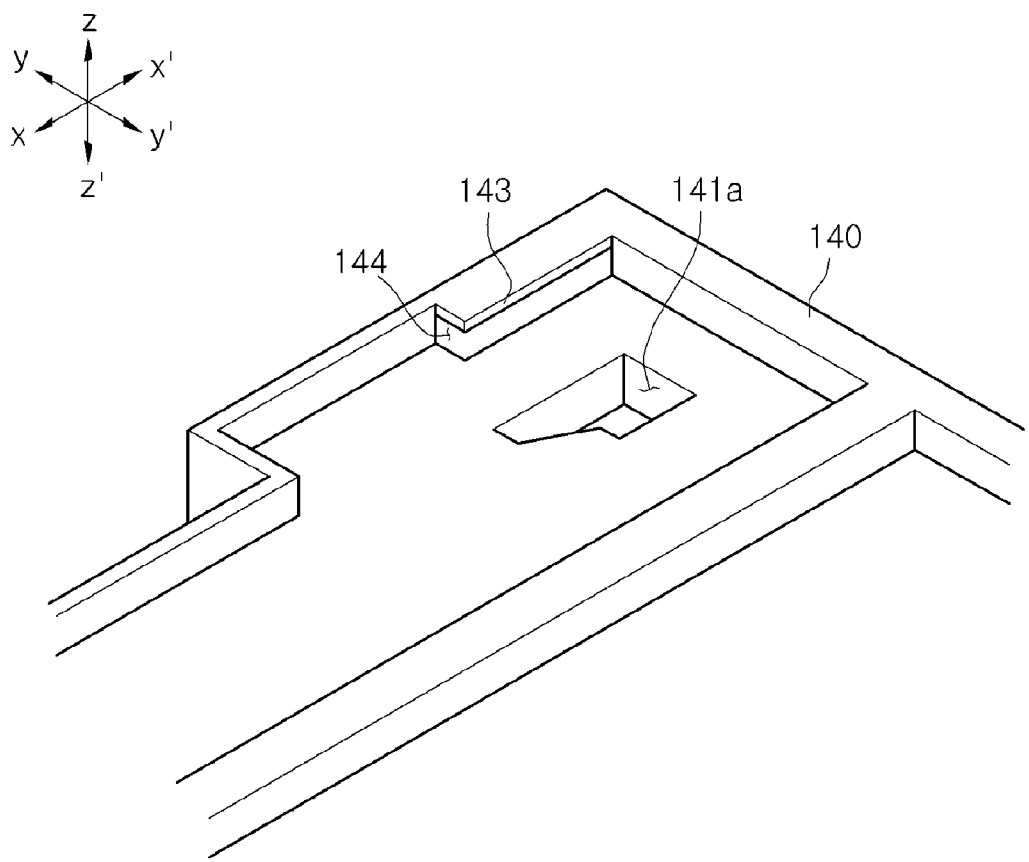
FIG. 4 is a perspective view illustrating an upper surface of the other side of the support main corresponding to the optical sensor unit.

The structure of the support main 140 according to the present embodiment is described in detail with reference to FIGS. 3 and 4. FIG. 3 is a cross-sectional view taken along line I-I' of FIG. 2, illustrating the backlight unit 120 of FIG. 1. FIG. 4 is a perspective view illustrating an upper surface of the other side of the support main 140 corresponding to the optical sensor unit 190.

Referring to FIGS. 3 and 4, in the backlight unit 120, the light incident hole 141a is formed in the other side of the support main 140 and the optical sensor unit 190 is disposed in an area corresponding to the light incident hole 141a. The optical sensor unit 190 includes a flexible printed circuit board (FPC) 193 and an optical sensor 191 mounted on a lower surface of the FPC 193.

The optical sensor 191 may be either a photodiode or a phototransistor, or may include any sensor capable of detecting light. The light incident hole 141a provides a path of light so that the light output from the light guide plate 160 may be incident on the optical sensor 191.

A plurality of first through third inclined surfaces 145a, 145b, and 145c inclined at angles different from one another are provided at an inner side surface of the light incident hole 141a corresponding to the side surface of the light guide plate 160. The first through third inclined surfaces 145a, 145b, and 145c guide the light output from the light guide plate 160 to be concentrated on the optical sensor 191. The light rays output from the light guide plate 160 indicated by arrows in FIG. 3 are reflected by the first through third inclined surfaces 145a, 145b, and 145c in the light incident hole 141a to proceed toward the optical sensor unit 190. Although in the present embodiment the light incident hole 141a is described to have the first through third inclined surfaces 145*a*, 145*b*, and 145*c*, any structure having at least two inclined surfaces may be employed, not limited to the above description.

The fixing protrusion 143 protrudes from the side surface of an edge of the support main 140 corresponding to the optical sensor unit 190 toward the inside of the support main 140. An accommodation portion 144 in which the FPC 193 of the optical sensor unit 190 is inserted is formed at the side surface of the support main 140 corresponding to the area where the fixing protrusion 143 is formed. The accommodation portion 144 is formed by the lower surface of the fixing protrusion 143 and the side surface of the support main 140 to prevent the FPC 193 from moving in a direction z-z'.

The optical sensor unit 190 of the present embodiment is fixed on the support main 140 as part of the FPC 193 is inserted in the accommodation portion 144. In the present embodiment, since the accommodation portion 144 and the fixing protrusion 143 are provided in the support main 140 to firmly fix the optical sensor unit 190. Thus, the optical sensor unit 190 may be prevented from being detached from the support main 140.

As described above, in the LCD device according to the present disclosure, since at least two inclined surface, that is, the inclined surfaces 145*a*, 145*b*, and 145*c* in the above-described embodiment, having different inclination angles are provided in the side surface of the light incident hole 141*a* formed in the corner area of one side of the support main 140 corresponding to the optical sensor unit 190, the light output from the light guide plate 160 is guided to be concentrated on the optical sensor unit 190 so that reliability in the light detection may be improved.

Therefore, the present disclosure improved the reliability in the light detection of the backlight unit, thus controlling the mixture of the red, green, and blue lights. As a result, the reliability of a color correction value controlling the white light output from the backlight unit may be improved.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A backlight unit comprising:
   a support main formed of a mold having a rectangular frame shape;
   a plurality of LEDs arranged at a side of the support main;
   a light guide plate arranged parallel to the plurality of LEDs and converting a point light to a surface light;
   an optical sensor unit arranged at the other side of the support main and detecting light emitted from the plurality of LEDs; and
   a light incident hole formed at the other side of the support main corresponding to the optical sensor unit and guiding light output from the light guide plate to proceed toward the optical sensor unit by changing a path of the light.

2. The backlight unit claimed as claim 1, wherein at least two inclined surfaces having different inclination angles are provided at an inner side surface of the light incident hole corresponding to the side surface of the light guide plate.

3. The backlight unit claimed as claim 2, wherein the light incident hole overlaps the optical sensor unit.

4. The backlight unit claimed as claim 1, further comprising a fixing protrusion protruding from the other side of the support main corresponding to the optical sensor unit toward the inside of the support main, to fix a flexible printed circuit board of the optical sensor unit.

5. The backlight unit claimed as claim 4, wherein an accommodation portion in which the flexible printed circuit board is inserted is formed under the fixing protrusion.

6. An LCD device comprising:
   an LCD panel;
   a support main formed of a mold corresponding to an edge of a lower side of the LCD panel;
   a plurality of LEDs arranged at a side of the support main;
   a light guide plate arranged parallel to the plurality of LEDs and converting a point light to a surface light;
   an optical sensor unit arranged at the other side of the support main and detecting light output from the plurality of LEDs; and
   a light guide hole formed at the other side of the support main corresponding to the optical sensor unit and guiding light output from the light guide plate to proceed toward the optical sensor unit by changing a path of the light.

7. The LCD device claimed as claim 6, wherein at least two inclined surfaces having different inclination angles are provided at an inner side surface of the light incident hole corresponding to the side surface of the light guide plate.

8. The LCD device claimed as claim 6, further comprising a fixing protrusion protruding from the other side of the support main corresponding to the optical sensor unit toward the inside of the support main, to fix a flexible printed circuit board of the optical sensor unit.

9. The LCD device claimed as claim 8, wherein an accommodation portion in which the flexible printed circuit board is inserted is formed under the fixing protrusion.

* * * * *